UNITED STATES PATENT OFFICE.

WALTER S. ROCKEY AND HILLIARY ELDRIDGE, OF NEW YORK, N. Y., ASSIGNORS TO METALLURGICAL RESEARCH COMPANY, A CORPORATION OF ARIZONA.

REFINING COPPER.

1,027,769.  Specification of Letters Patent.  Patented May 28, 1912.

No Drawing.  Application filed January 28, 1911.  Serial No. 605,282.

*To all whom it may concern:*

Be it known that we, WALTER S. ROCKEY and HILLIARY ELDRIDGE, citizens of the United States, both residing at New York city, in the county of New York and State of New York, have invented certain new and useful Improvements in Refining Copper, of which the following is a full, clear, and exact specification.

Our invention relates to the art of refining copper, the object of which is to decrease the cost of refining copper and to give the copper a higher degree of purity than has heretofore been obtained.

To carry out our process of refining copper, we fuse the copper by the application of heat, and in any suitable apparatus, and for the purpose of reducing the oxids present in the copper, carbon or other reducing medium may be added to the fusing copper; and having previously provided a molten bath of anhydrous boron trioxid ($B_2O_3$) or one containing anhydrous boron trioxid, or any other anhydrous flux which has the property of absorbing and holding in suspension the metallic oxids and other impurities in the metal, we direct the fused copper through said anhydrous flux, that is, pour it from above the flux down into the flux, through the flux, and upward out of the flux, or through suitable means into one side of the flux and out of the other side of the flux, but we prefer to have it flow as first stated, downward into and upward out of the flux. During the time that the fused copper is in contact with the anhydrous flux, its temperature is maintained at the required point to expel all or the majority of the occluded gases and to permit solution of the oxids by the fused boron trioxid. During the time that the molten copper is in contact with the flux, carbon or other reducing agents may be added to the flux to increase or add to the activity of the anhydrous boron trioxid in dissolving the metallic oxids.

The anhydrous boron trioxid described may be conveniently prepared in accordance with the specification of our prior Patent No. 971,563, dated October 4th, 1910.

Having thus described our invention, we claim:

1. The process of refining copper, which consists in first fusing the copper by heat, then directing the fused copper through a bath of fused anhydrous boron trioxid ($B_2O_3$), and maintaining the heat of the copper until all occluded gases have been expelled and the oxids present dissolved by the boron trioxid.

2. The process of refining copper, which consists in first fusing the copper, then adding a reducing body to the fused copper to reduce a portion of the oxids present, then directing the fused and partially deoxidized copper through a bath of anhydrous boron trioxid ($B_2O_3$) and maintaining the heat of the copper until all occluded gases have been expelled and the oxids present dissolved by the boron trioxid.

3. The process of refining copper which consists in first fusing the copper by heat, then directing the fused copper through a bath of fused anhydrous boron trioxid and a reducing agent, and maintaining the heat of the copper until all occluded gases have been expelled and the oxids present dissolved.

4. The process of refining copper which consists in first fusing the copper by heat, then directing the fused copper through a bath of fused anhydrous boron trioxid and intermixed carbon, and maintaining the heat of the copper until all occluded gases have been expelled and the oxids present dissolved.

In testimony whereof, we affix our signatures, in presence of two witnesses.

WALTER S. ROCKEY.
HILLIARY ELDRIDGE.

Witnesses:
G. F. QUACKINBUSH,
JOSEPH MATTES.